United States Patent Office 2,820,829
Patented Jan. 21, 1958

2,820,829

DIPHENYLAMINE PROCESS

John J. Kalvinskas, Woodbury Heights, N. J., assignor to E. I. du Pont de Nemours and Company, Wilmington, Del., a corporation of Delaware No Drawing. Application August 23, 1955
Serial No. 530,215

4 Claims. (Cl. 260—576)

The present invention relates to the production of diphenylamine. More particularly, this invention relates to an improved process for the catalytic condensation of aniline.

The production of diphenylamine by the condensation of aniline under pressure in the presence of a halide catalyst has been commercially practiced for many years. In the early years, hydrogen chloride and compounds which formed hydrogen chloride under the reaction conditions, such as aniline hydrochloride or ammonium chloride, were widely used as the catalysts for the condensation reaction, which was carried out at about 300° C. and at pressures of about 150–300 pounds per square inch. The temperature was carefully controlled within a relatively narrow range of 275° to 325° C., the upper temperature limit being based on the excessive tar formation the experimenters found at temperatures above 325° C., and the lower temperature limit representing that temperature at which very little condensation occurred.

During the 1940's, the discovery was made that the retention time required for the conversion of aniline to diphenylamine could be reduced to one-third by replacing the hydrogen chloride-forming halide with ferric chloride as the catalyst, and later the finding was made that aluminum chloride was a superior catalyst, and their use supplanted entirely the use of the hydrogen chloride-forming compounds in commercial operations. Nevertheless, the use of a metal halide catalyst is not completely satisfactory in that the retention time is still necessarily quite long, the catalysts are relatively expensive, and the catalyst cannot be effectively reused.

Accordingly, an object of the present invention is to provide an improved process for the production of diphenylamine by the catalytic condensation of aniline. A further object is to provide such process wherein greatly reduced retention times are necessary. A still further object is to provide such process wherein a relatively inexpensive catalyst is used and wherein the catalyst may be recycled or reused. Additional objectives will become apparent as this invention is more fully described.

I have found that the foregoing objects are achieved and a high yield of diphenylamine is obtained when I condense aniline in the presence of hydrogen chloride or a selected hydrogen chloride-forming catalyst at a temperature between 380° C. and 425° C. and at pressures sufficient to maintain the aniline essentially in a liquid phase at the reaction temperature.

In order to fully illustrate the present invention, reference is now made to the following examples. It will be understood that the examples are representative only, and that the invention is not limited to the specific embodiments shown in the examples.

Example 1

Aniline in the amount of 600 parts and 12 parts of ammonium chloride (2% catalyst concentration) were charged into an autoclave. The temperature of the reactants was raised to 392° C. and maintained at this temperature for 2 hours. The autogenous pressure rose to about 550 pounds per square inch and was maintained at this level by bleeding off gaseous ammonia produced as the reaction proceeded. At the end of the heating period, the autoclave was vented, and the diphenylamine and tars were separated from the unreacted aniline in the autoclave. The diphenylamine content amounted to 226 parts corresponding to a 41.5% conversion. The tar content amounted to 20 parts; thus the yield of diphenylamine obtained, based on theory, was 92.5%.

In a similar run, except that a retention time of 1 hour, a temperature of 415° C. and a pressure of 600 pounds per square inch were used, the conversion to aniline was 34% at a 87.5% yield.

Example 2

A charge of 600 parts of aniline and 60 parts of ammonium chloride (10% catalyst concentration) was heated in an autoclave to 409° C. and maintained at this temperature and an autogenous pressure of 550 pounds per square inch for 2 hours. Upon separation of the diphenylamine and tar from unreacted aniline, 294.5 parts of diphenylamine and 40 parts of tar were recovered. This represents a 54% conversion to diphenylamine and a yield of 89%.

Example 3

A charge of 600 parts of aniline and 20 parts of a 37% aqueous solution of hydrogen chloride (7.4 parts HCl, 1.2% catalyst concentration) was heated in an autoclave to 408° C. and maintained at this temperature and 600 pounds per square inch pressure for one hour. The diphenylamine and tar were separated from the unreacted aniline, 245 parts of diphenylamine (45% conversion, 86% yield) and 44 parts of tar were obtained.

Example 4

A charge of 600 parts of aniline and 60 parts of aniline hydrochloride (equivalent to 16.9 parts hydrogen chloride or a catalyst concentration in terms of hydrogen chloride of 2.6%) was heated in an autoclave to 415° C. and maintained at a temperature of 415–425° C. and a pressure of 570 pounds per square inch for 2 hours. On separation, 267 parts of diphenylamine and 40 parts of tar were obtained, corresponding to a 49% conversion of diphenylamine and an 88% yield.

In comparison with the foregoing, an aniline charge containing 4.45% ammonium chloride catalyst was maintained at the temperatures practiced by the prior art, i. e., 315° C. for a period of 20 hours. The conversion to diphenylamine was only 28.6%. As shown in U. S. Patent 2,447,044, when a hydrated ferric chloride catalyst is used at a temperature of 316° C. and a pressure of 350 pounds per square inch, a 20 hour period is required to produce a 47% conversion to diphenylamine. When anhydrous ferric chloride was used, a conversion of 24% after two hours was reported. The patentees pointed out that prior art catalysts, such as those used in the present process, required between 2 and 3 times the retention time required when the ferric chloride catalyst was used.

In addition to the greatly reduced retention time needed in the present process to obtain equivalent or better conversions and yields than previously obtained, the present invention permits reuse of the catalyst.

Example 5

A charge of 600 parts of aniline and 16 parts of an ammonium chloride catalyst residue obtained by filtration from a previous run was heated at 390° C. and 570 pounds per square inch pressure for 2 hours. A conversion of 40% (218 parts of diphenylamine and 40 parts of tar) and a yield of 85.5% were obtained.

Attempts to reuse metallic halide catalysts in the condensation of aniline have not met with success.

The improvement in conversion to diphenylamine concurrent with maintenance of high yield by operation at the described temperature range, i. e., 380 to 425° C., appears to be peculiar to hydrogen chloride and selected compounds which form hydrogen chloride at elevated temperatures, i. e., ammonium chloride and aniline hydrochloride. For example, the following table indicates the results obtained by substituting other halide catalysts in runs similar to that described in Example 1.

| Catalyst | Conversion to diphenylamine, percent | Parts of tar per 100 parts diphenylamine |
|---|---|---|
| Ammonium iodide | 29.3 | 81.2 |
| Ammonium fluoride | 6.2 | 32.4 |
| Ammonium bromide | 23.7 | 51.2 |
| Ferric chloride | 20.9 | 42.98 |

A formation of more than 20 parts of tar per hundred parts of diphenylamine is excessive and renders the process unsound from a commercial standpoint. The above results may explain the prior art belief that 315–325° C. represented a maximum operative temperature.

The present process is a liquid-phase process, and the temperatures and pressures must be such that the essential reactant, i. e., aniline, is present as a liquid. The critical temperature of aniline, i. e., the highest temperature at which a liquid phase can be maintained under pressure, is approximately 425° C. for pure aniline. As diphenylamine is produced, the critical temperature of the solution thus produced rises somewhat, so that a slightly higher temperature can be used. However, I prefer to operate at temperatures no higher than 425° C. At temperatures below about 380° C., the high conversion and excellent yield cannot be obtained unless a considerably longer retention time is used. While I do not wish to be bound to any particular theory, I believe that hydrogen chloride represents the active catalyst for the condensation to diphenylamine, and that at temperatures of 380° C. and above, an increased amount of free hydrogen chloride is available due to the dissociation of ammonium chloride and aniline hydrochloride. At lower temperatures, the presence of excess aniline and the ammonia produced by the condensation reaction reduces the quantity of free hydrogen chloride available to act as the catalyst.

The pressures used are generally produced by the heating of the reactants in a sealed reactor. The regulation of pressure can readily be performed by conventional means such as controlled bleeding-off of the ammonia. To maintain a liquid aniline phase at 380° C. at the beginning of the reaction, the pressure must exceed 480 pounds per square inch. As the concentration of diphenylamine increases, less pressure is needed to maintain the remaining aniline in the liquid phase. However, I prefer to operate at pressures between 500 and 1000 pounds per square inch.

The retention time for the optimum conversion of aniline to diphenylamine with a minimum formation of undesirable tar will vary with the catalyst concentration and the reaction temperature. I have found that in the early stages of the reaction, the proportion of tar to diphenylamine is very high; as the reaction continues, diphenylamine is produced more rapidly than is the tar until an equilibrium between the diphenylamine and the aniline is reached, but the tar formation continues throughout. Accordingly, a retention time of less than four hours is preferred to avoid the formation of excessive quantities of tar. At a retention time of about 15 minutes, at high catalyst ratio and high temperature (about 415°–425° C.), a conversion of about 17% at an 85% yield will be obtained. Because of the economic value of short retention time, operation at this low conversion level may be commercially feasible, but this represents the minimum retention time for satisfactory operation. I prefer to use a retention time between about 45 minutes and two hours.

As shown by the examples, the catalyst concentration can be varied over a comparatively wide range. I prefer, however, to use a catalyst concentration between 0.1% and 10%, based on the weight of aniline charged.

Many modifications will occur to those skilled in the art which are within the scope of this invention. Accordingly, I intend to be limited only by the following claims.

I claim:

1. A process for preparing diphenylamine which comprises condensing aniline in the presence of a catalyst selected from the group consisting of hydrogen chloride, ammonium chloride and aniline hydrochloride at a temperature in the range of 380° C. and 425° C. and at a pressure sufficient to maintain essentially all of the aniline in a liquid phase.

2. A process as claimed in claim 1, wherein the catalyst is ammonium chloride.

3. A process as claimed in claim 1, wherein the retention is less than 4 hours.

4. A process as claimed as claim 1, wherein the catalyst concentration is between 0.1 and 10% based on the weight of aniline charged.

References Cited in the file of this patent

UNITED STATES PATENTS

| | | |
|---|---|---|
| 1,314,538 | Rogers | Sept. 2, 1919 |
| 1,422,494 | Tanberg | July 11, 1922 |
| 1,549,136 | Lachman | Aug. 11, 1925 |
| 1,840,576 | Frei | Jan. 12, 1932 |
| 2,645,662 | Nimmo | July 14, 1953 |